(12) United States Patent
Garudadri

(10) Patent No.: US 7,203,643 B2
(45) Date of Patent: Apr. 10, 2007

(54) METHOD AND APPARATUS FOR TRANSMITTING SPEECH ACTIVITY IN DISTRIBUTED VOICE RECOGNITION SYSTEMS

(75) Inventor: Harinath Garudadri, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 663 days.

(21) Appl. No.: 10/157,629

(22) Filed: May 28, 2002

(65) Prior Publication Data

US 2003/0061042 A1 Mar. 27, 2003

Related U.S. Application Data

(60) Provisional application No. 60/298,502, filed on Jun. 14, 2001.

(51) Int. Cl.
*G10L 11/02* (2006.01)
*G10L 15/02* (2006.01)

(52) U.S. Cl. .................... 704/233; 704/270.1
(58) Field of Classification Search ........... 704/233, 704/270.1
See application file for complete search history.

(56) References Cited

U.S. PATENT DOCUMENTS

| | | | | |
|---|---|---|---|---|
| 5,742,930 | A * | 4/1998 | Howitt ..................... | 704/502 |
| 5,956,683 | A | 9/1999 | Jacobs et al. ............... | 704/275 |
| 5,960,399 | A | 9/1999 | Barclay et al. ............ | 704/270 |
| 6,195,636 | B1 | 2/2001 | Crupi et al. ................ | 704/231 |
| 6,243,739 | B1 * | 6/2001 | Schwartz et al. ........... | 709/206 |
| 6,275,800 | B1 * | 8/2001 | Chevalier et al. .......... | 704/246 |
| 6,366,886 | B1 * | 4/2002 | Dragosh et al. ......... | 704/270.1 |
| 6,577,862 | B1 * | 6/2003 | Davidson et al. ........... | 370/433 |
| 6,697,776 | B1 * | 2/2004 | Fayad et al. ................ | 704/233 |
| 6,782,361 | B1 * | 8/2004 | El-Maleh et al. ........... | 704/226 |
| 6,791,944 | B1 * | 9/2004 | Demetrescu et al. ........ | 370/235 |

(Continued)

FOREIGN PATENT DOCUMENTS

| | | |
|---|---|---|
| EP | 0671721 | 2/1995 |
| WO | 02061727 | 8/2002 |

OTHER PUBLICATIONS

"The Performance Evaluation of Distributed Speech Recognition for Chinese Digits," by Zhao et al., Proceedings of the 17th International Conference on AINA '03, Mar. 27-29, 2003, pp. 151-154.*

*Primary Examiner*—Talivaldis Ivars Smits
*Assistant Examiner*—Eunice Ng
(74) *Attorney, Agent, or Firm*—Thomas Rouse; Charles D. Brown; Donald C. Kordich

(57) ABSTRACT

A system and method for transmitting speech activity in a distributed voice recognition system. The distributed voice recognition system includes a local VR engine in a subscriber unit and a server VR engine on a server. The local VR engine comprises an advanced feature extraction (AFE) module that extracts features from a speech signal, and a voice activity detection (VAD) module that detects voice activity within a speech signal. The combined results from the VAD module and feature extraction module are provided in an efficient manner to a remote device, such as a server, in the form of advanced front end features, thereby enabling the server to process speech segments free of silence regions. Various aspects of efficient speech segment transmission are disclosed.

34 Claims, 10 Drawing Sheets

U.S. PATENT DOCUMENTS

| | | |
|---|---|---|
| 6,803,964 B1 * | 10/2004 | Post et al. ................ 348/423.1 |
| 6,813,606 B2 * | 11/2004 | Ueyama et al. .......... 704/270.1 |
| 6,823,306 B2 * | 11/2004 | Reding et al. .............. 704/244 |
| 6,868,385 B1 * | 3/2005 | Gerson ....................... 704/275 |
| 6,885,735 B2 * | 4/2005 | Odinak et al. ............. 379/88.1 |
| 6,901,362 B1 * | 5/2005 | Jiang et al. ................. 704/214 |
| 2001/0001866 A1 * | 5/2001 | Kikinis ....................... 709/220 |
| 2003/0004712 A1 * | 1/2003 | Erell ........................... 704/225 |
| 2003/0046711 A1 * | 3/2003 | Cui et al. .................... 725/134 |
| 2003/0125955 A1 * | 7/2003 | Arnold et al. ........... 704/270.1 |
| 2003/0139930 A1 * | 7/2003 | He et al. .................. 704/270.1 |
| 2003/0182113 A1 * | 9/2003 | Huang ..................... 704/270.1 |
| 2005/0119896 A1 * | 6/2005 | Bennett et al. .......... 704/270.1 |

* cited by examiner

METHOD AND APPARATUS FOR TRANSMITTING SPEECH ACTIVITY IN DISTRIBUTED VOICE RECOGNITION SYSTEMS

CROSS REFERENCE

This application claims priority based on Provisional Application No. 60/298,502, filed Jun. 14, 2001, entitled "Method and Apparatus for Transmitting Speech Activity in Distributed Voice Recognition Systems," currently assigned to the assignee of the present invention.

BACKGROUND

1. Field

The present invention relates generally to the field of communications and more specifically to transmitting speech activity in a distributed voice recognition system.

2. Background

Voice recognition (VR) represents an important technique enabling a machine with simulated intelligence to recognize user-voiced commands and to facilitate a human interface with the machine. VR also represents a key technique for human speech understanding. Systems employing techniques to recover a linguistic message from an acoustic speech signal are called voice recognizers.

VR, also known as speech recognition, provides certain safety benefits to the public. For example, VR may be employed to replace the manual task of pushing buttons on a wireless keypad, a particularly useful replacement when the operator is using a wireless handset while driving an automobile. When a user employs a wireless telephone without VR capability, the driver must remove his or her hand from the steering wheel and look at the telephone keypad while pushing buttons to dial the call. Such actions tend to increase the probability of an automobile accident. A speech-enabled automobile telephone, or telephone designed for speech recognition, enables the driver to place telephone calls while continuously monitoring the road. In addition, a hands-free automobile wireless telephone system allows the driver to hold both hands on the steering wheel while initiating a phone call. A sample vocabulary for a simple hands-free automobile wireless telephone kit might include the 10 digits, the keywords "call," "send," "dial" "cancel," "clear," "add," "delete," history," "program," "yes," and "no," and the names of a predefined number of commonly called co-workers, friends, or family members.

A voice recognizer, or VR system, comprises an acoustic processor, also called the front end of a voice recognizer, and a word decoder, also called the back end of the voice recognizer. The acoustic processor performs feature extraction for the system by extracting a sequence of information bearing features, or vectors, necessary for performing voice recognition on the incoming raw speech. The word decoder subsequently decodes the sequence of features, or vectors, to provide a meaningful and desired output, such as the sequence of linguistic words corresponding to the received input utterance.

In a voice recognizer implementation using a distributed system architecture, it is often desirable to place the word decoding task on a subsystem having the ability to appropriately manage computational and memory load, such as a network server. The acoustic processor should physically reside as close to the speech source as possible to reduce adverse effects associated with vocoders. Vocoders compress speech prior to transmission, and can in certain circumstances introduce adverse characteristics due to signal processing and/or channel induced errors. These effects typically result from vocoding at the user device. The advantage to a Distributed Voice Recognition (DVR) system is that the acoustic processor resides in the user device and the word decoder resides remotely, such as on a network, thereby decreasing the risk of user device signal processing errors or channel errors.

DVR systems enable devices such as cell phones, personal communications devices, personal digital assistants (PDAs), and other devices to access information and services from a wireless network, such as the Internet, using spoken commands. These devices access voice recognition servers on the network and are much more versatile, robust and useful than systems recognizing only limited vocabulary sets.

In wireless applications, air interface methods degrade the overall accuracy of the voice recognition systems. This degradation can in certain circumstances be mitigated by extracting VR features from a user's spoken commands. Extraction occurs on a device, such as a subscriber unit, also called a subscriber station, mobile station, mobile, remote station, remote terminal, access terminal, or user equipment. The subscriber unit can transmit the VR features in data traffic, rather than transmitting spoken words in voice traffic.

Thus, in a DVR system, front end features are extracted at the device and are sent to the network. A device may be mobile or stationary, and may communicate with one or more base stations (BSes), also called cellular base stations, cell base stations, base transceiver system (BTSes), base station transceivers, central communication centers, access points, access nodes, Node Bs, and modem pool transceivers (MPTs).

Complex voice recognition tasks require significant computational resources. Such systems cannot practically reside on a subscriber unit having limited CPU, battery, and memory resources. Distributed systems leverage the computational resources available on the network. In a typical DVR system, the word decoder has significantly higher computational and memory requirements than the front end of the voice recognizer. Thus a server based voice recognition system within the network serves as the backend of the voice recognition system and performs word decoding. Using the server based VR system as the backend provides the benefit of performing complex VR tasks using network resources rather than user device resources. Examples of DVR systems are disclosed in U.S. Pat. No. 5,956,683, entitled "Distributed Voice Recognition System," assigned to the assignee of the present invention and incorporated by reference herein.

The subscriber may perform simple VR tasks in addition to the feature extraction function. Performance of these functions at the user terminal frees the network of the need to engage in simple VR tasks, thereby reducing network traffic and the associated cost of providing speech enabled services. In certain circumstances, traffic congestion on the network can result in poor service for subscriber units from the server based VR system. A distributed VR system enables rich user interface features using complex VR tasks, with the downside of increased network traffic and occasional delay.

As part of the VR system, it can be beneficial to reduce network traffic by transmitting data smaller than actual speech over the air interface, such as speech features or other voice parameters. It has been found that the use of a Voice Activity Detection (VAD) module in the mobile device can reduce network traffic by converting speech into frames and transmitting those frames over the air interface. However, in particular circumstances, the nature and quality of the content of these frames can drastically affect overall system performance. Speech subsets that operate under one set of circumstances may in other circumstances require excessive processing at the server, thereby diminishing the quality of the conversation.

In a DVR system, a need exists for a reduction in overall network congestion and the amount of delay in the system as well as the ability to provide efficient voice activity detection functionality for the system based on circumstances presented.

SUMMARY

The aspects described herein are directed to a system and method for transmitting speech activity to reduce network congestion and delay. A system and method for transmitting speech activity voice recognition includes a Voice Activity Detection (VAD) module and a Feature Extraction (FE) module, in one aspect located on the subscriber unit.

In one aspect, detected voice activity information related to a speech signal is assembled, feature extraction information related to the speech signal is identified, and the detected voice activity information and feature extraction information are selectively utilized to form advanced front end (AFE) data. The advanced front end data comprises voice activity data and is provided to the remote device.

In another aspect, the system includes a voice activity detector, a feature extractor operating substantially in parallel to the voice activity detector, a transmitter, and a receiving device, wherein the feature extractor and voice activity detector operate to extract features from speech and detect voice activity information from speech and selectively utilize extracted features and detected voice activity information to form advanced front end data.

In still another aspect, speech data is transmitted to a remote device by extracting voice activity data from the speech data, identifying feature extraction data from the speech data, and selectively transmitting information related to the voice activity data and the feature extraction data in the form of advanced front end data to the remote device.

BRIEF DESCRIPTION OF THE DRAWINGS

The features, nature, and advantages of the present invention will become more apparent from the detailed description set forth below when taken in conjunction with the drawings in which like reference characters identify correspondingly throughout and wherein.

DETAILED DESCRIPTION

Figure 1:
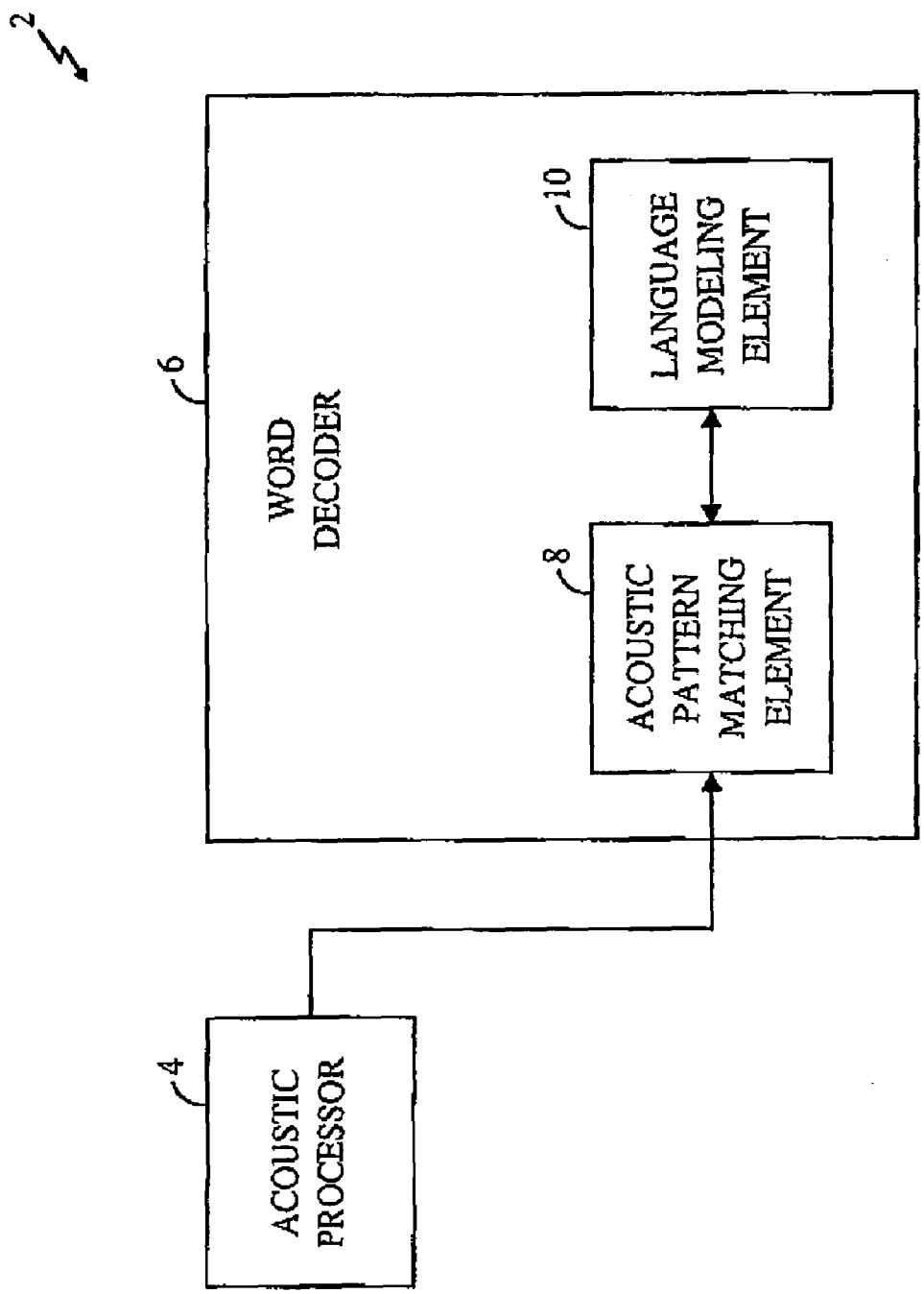
FIG. 1 shows a voice recognition system including an Acoustic Processor and a Word Decoder in accordance with one aspect.

FIG. 1 illustrates a voice recognition system 2 including an acoustic processor 4 and a word decoder 6 in accordance with one aspect of the current system. The word decoder 6 includes an acoustic pattern matching element 8 and a language modeling element 10. The language modeling element 10 is also known by some in the art as a grammar specification element. The acoustic processor 4 is coupled to the acoustic matching element 8 of the word decoder 6. The acoustic pattern matching element 8 is coupled to the language modeling element 10.

The acoustic processor 4 extracts features from an input speech signal and provides those features to word decoder 6. In general, the word decoder 6 translates the acoustic features received from the acoustic processor 4 into an estimate of the speaker's original word string. The estimate is created via acoustic pattern matching and language modeling. Language modeling may be omitted in certain situations, such as applications of isolated word recognition. The acoustic pattern matching element 8 detects and classifies possible acoustic patterns, such as phonemes, syllables, words, and so forth. The acoustic pattern matching element 8 provides candidate patterns to language modeling element 10, which models syntactic constraint rules to determine grammatically well formed and meaningful word sequences. Syntactic information can be employed in voice recognition when acoustic information alone is ambiguous. The voice recognition system sequentially interprets acoustic feature matching results and provides the estimated word string based on language modeling.

Both the acoustic pattern matching and language modeling in the word decoder 6 require deterministic or stochastic modeling to describe the speaker's phonological and acoustic-phonetic variations. Speech recognition system performance is related to the quality of pattern matching and language modeling. Two commonly used models for acoustic pattern matching known by those skilled in the art are template-based dynamic time warping (DTW) and stochastic hidden Markov modeling (HMM).

The acoustic processor 4 represents a front end speech analysis subsystem of the voice recognizer 2. In response to an input speech signal, the acoustic processor 4 provides an appropriate representation to characterize the time varying speech signal. The acoustic processor 4 may discard irrelevant information such as background noise, channel distortion, speaker characteristics, and manner of speaking. The acoustic feature may furnish voice recognizers with higher acoustic discrimination power. In this aspect of the system, the short time spectral envelope is a highly useful characteristic. In characterizing the short time spectral envelope, a commonly used spectral analysis technique is filter-bank based spectral analysis.

Combining multiple VR systems, or VR engines, provides enhanced accuracy and uses a greater amount of information from the input speech signal than a single VR system. One system for combining VR engines is described in U.S. Pat. No. 6,671,669, which issued on Dec. 30, 2003 and is, entitled "Combined Engine System and Method for Voice Recognition," and U.S. patent application Ser. No. 09/657,760, entitled "System and Method for Automatic Voice Recognition Using Mapping," filed Sep. 8, 2000, assigned to the assignee of the present application and fully incorporated herein by reference.

In one aspect of the present system, multiple VR engines are combined into a distributed VR system. The multiple VR engines provide a VR engine at both the subscriber unit and the network server. The VR engine on the subscriber unit is called the local VR engine, while the VR engine on the server is called the network VR engine. The local VR engine comprises a processor for executing the local VR engine and a memory for storing speech information. The network VR engine comprises a processor for executing the network VR engine and a memory for storing speech information.

One example of a distributed VR system is disclosed in U.S. patent application Ser. No. 09/755,651, entitled "System and Method for Improving Voice Recognition in a Distributed Voice Recognition System," filed Jan. 5, 2001, assigned to the assignee of the present invention and incorporated by reference herein.

Figure 2:
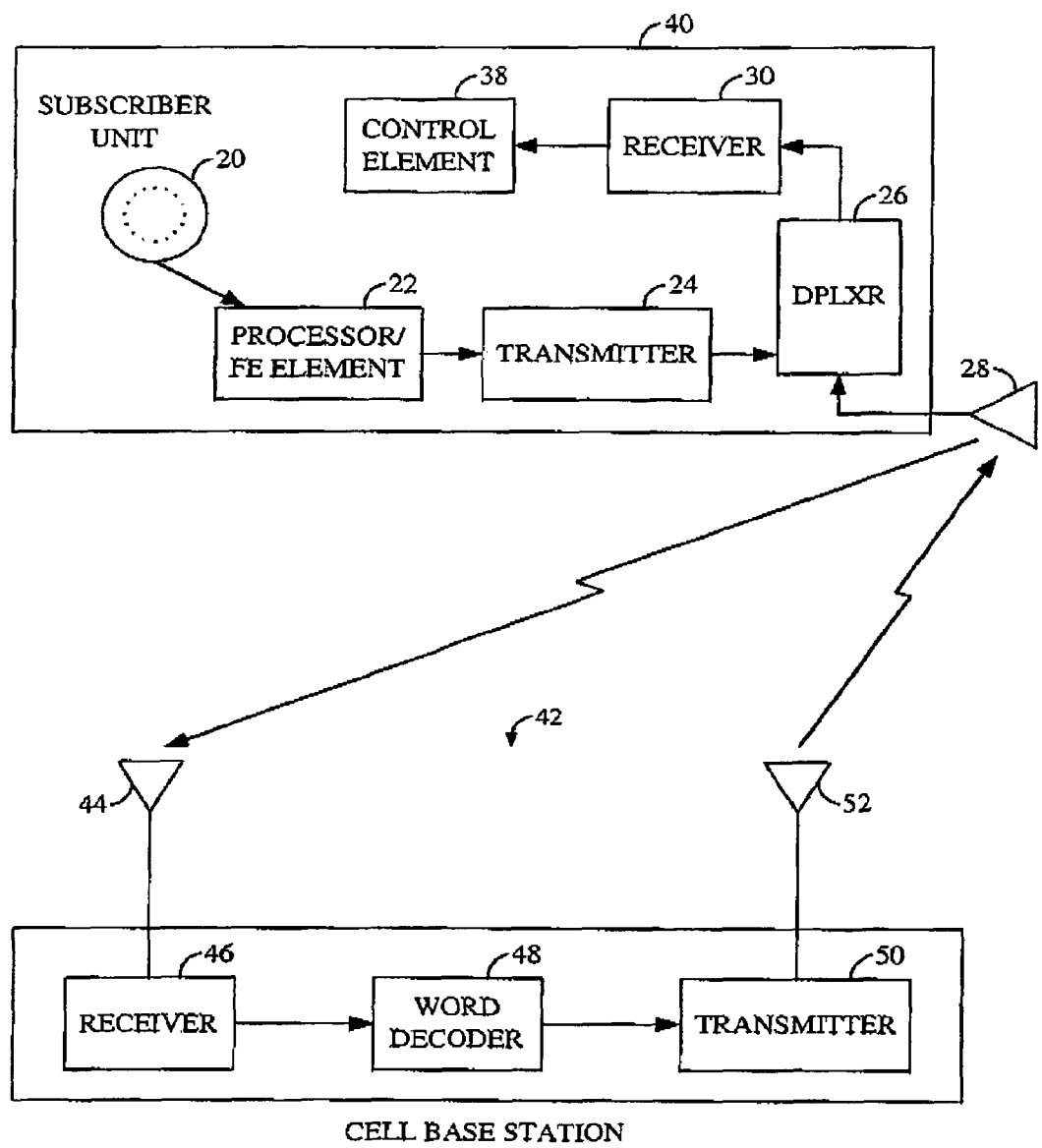
FIG. 2 shows an exemplary aspect of a distributed voice recognition system.

FIG. 2 shows one aspect of the present system. In FIG. 2, the environment is a wireless communication system comprising a subscriber unit 40 and a central communications center known as a cell base station 42. In this aspect, the distributed VR includes an acoustic processor or feature extraction element 22 residing in a subscriber unit 40 and a word decoder 48 residing in the central communications center 42. Because of the high computation costs associated with voice recognition implemented solely on a subscriber unit, voice recognition in a non-distributed voice recognition system for even a medium size vocabulary would be highly infeasible. If VR resides solely at the base station or on a remote network, accuracy may be decreased dramatically due to degradation of speech signals associated with speech codec and channel effects. Advantages for a distributed system include reduction in cost of the subscriber unit resulting from the absence of word decoder hardware, and reduction of subscriber unit battery drain associated with local performance of the computationally intensive word decoder operation. A distributed system improves recognition accuracy in addition to providing flexibility and extensibility of the voice recognition functionality.

Speech is provided to microphone 20, which converts the speech signal into electrical signals and provided to feature extraction element 22. Signals from microphone 20 may be analog or digital. If analog, an A/D converter (not shown) may be interposed between microphone 20 and feature extraction element 22. Speech signals are provided to feature extraction element 22, which extracts relevant characteristics of the input speech used to decode the linguistic interpretation of the input speech. One example of characteristics used to estimate speech is the frequency characteristics of an input speech frame. Input speech frame characteristics are frequently employed as linear predictive coding parameters of the input speech frame. The extracted speech features are then provided to transmitter 24 which codes, modulates, and amplifies the extracted feature signal and provides the features through duplexer 26 to antenna 28, where the speech features are transmitted to cellular base station or central communications center 42. Various types of digital coding, modulation, and transmission schemes known in the art may be employed by the transmitter 24.

At central communications center 42, the transmitted features are received at antenna 44 and provided to receiver 46. Receiver 46 may perform the functions of demodulating and decoding received transmitted features, and receiver 46 provides these features to word decoder 48. Word decoder 48 determines a linguistic estimate of the speech from the speech features and provides an action signal to transmitter 50. Transmitter 50 amplifies, modulates, and codes the action signal, and provides the amplified signal to antenna 52. Antenna 52 transmits the estimated words or a command signal to the subscriber unit 40, such as a portable phone. Transmitter 50 may also employ digital coding, modulation, or transmission techniques known in the art.

At subscriber unit 40, the estimated words or command signals are received at antenna 28, which provides the received signal through duplexer 26 to receiver 30 which demodulates and decodes the signal and provides command signal or estimated words to control element 38. In response to the received command signal or estimated words, control element 38 provides the intended response, such as dialing a phone number, providing information to a display screen on the portable phone, and so forth.

In one aspect of the present system, the information sent from central communications center 42 need not be an interpretation of the transmitted speech, but may instead be a response to the decoded message sent by the portable phone. For example, one may inquire about messages on a remote answering machine coupled via a communications network to central communications center 42, in which case the signal transmitted from the central communications center 42 to subscriber unit 40 may be the messages from the answering machine. A second control element for controlling the data, such as the answering machine messages, may also be located in the central communications center.

A VR engine obtains speech data in the form of Pulse Code Modulation, or PCM, signals. The VR engine processes the signal until a valid recognition is made or the user has stopped speaking and all speech has been processed. In one aspect, the DVR architecture includes a local VR engine that obtains PCM data and transmits front end information. The front end information may include cepstral parameters, or may be any type of information or features that characterize the input speech signal. Any type of features known in the art could be used to characterize the input speech signal.

For a typical recognition task, the local VR engine obtains a set of trained templates from its memory. The local VR engine obtains a grammar specification from an application. An application is service logic that enables users to accomplish a task using the subscriber unit. This logic is executed by a processor on the subscriber unit. It is a component of a user interface module in the subscriber unit.

A system and method for improving storage of templates in a voice recognition system is described in U.S. Pat. No. 6,681,207, which issued on Jan. 20, 2004 and is entitled "System and Method for Lossy Compression of Voice Recognition Models," which is assigned to the assignee of the present invention and fully incorporated herein by reference. A system and method for improving voice recognition in noisy environments and frequency mismatch conditions and improving storage of templates is described in U.S. patent application Ser. No. 09/703,191, entitled "System and Method for Improving Voice Recognition In Noisy Environments and Frequency Mismatch Conditions", filed Oct. 30, 2000, which is assigned to the assignee of the present invention and fully incorporated herein by reference.

A "grammar" specifies the active vocabulary using sub-word models. Typical grammars include 7-digit phone numbers, dollar amounts, and a name of a city from a set of names. Typical grammar specifications include an "Out of Vocabulary (OOV)" condition to represent the situation where a confident recognition decision could not be made based on the input speech signal.

In one aspect, the local VR engine generates a recognition hypothesis locally if it can handle the VR task specified by the grammar. The local VR engine transmits front-end data to the VR server when the grammar specified is too complex to be processed by the local VR engine.

As used herein, a forward link refers to transmission from the network server to a subscriber unit and a reverse link refers to transmission from the subscriber unit to the network server. Transmission time is partitioned into time units. In one aspect of the present system, the transmission time may be partitioned into frames. In another aspect, the transmission time may be partitioned into time slots. In accordance with one aspect, the system partitions data into data packets and transmits each data packet over one or more time units. At each time unit, the base station can direct data transmission to any subscriber unit, which is in communication with the base station. In one aspect, frames may be further partitioned into a plurality of time slots. In yet another aspect, time slots may be further partitioned, such as into half-slots and quarter-slots.

Figure 3:
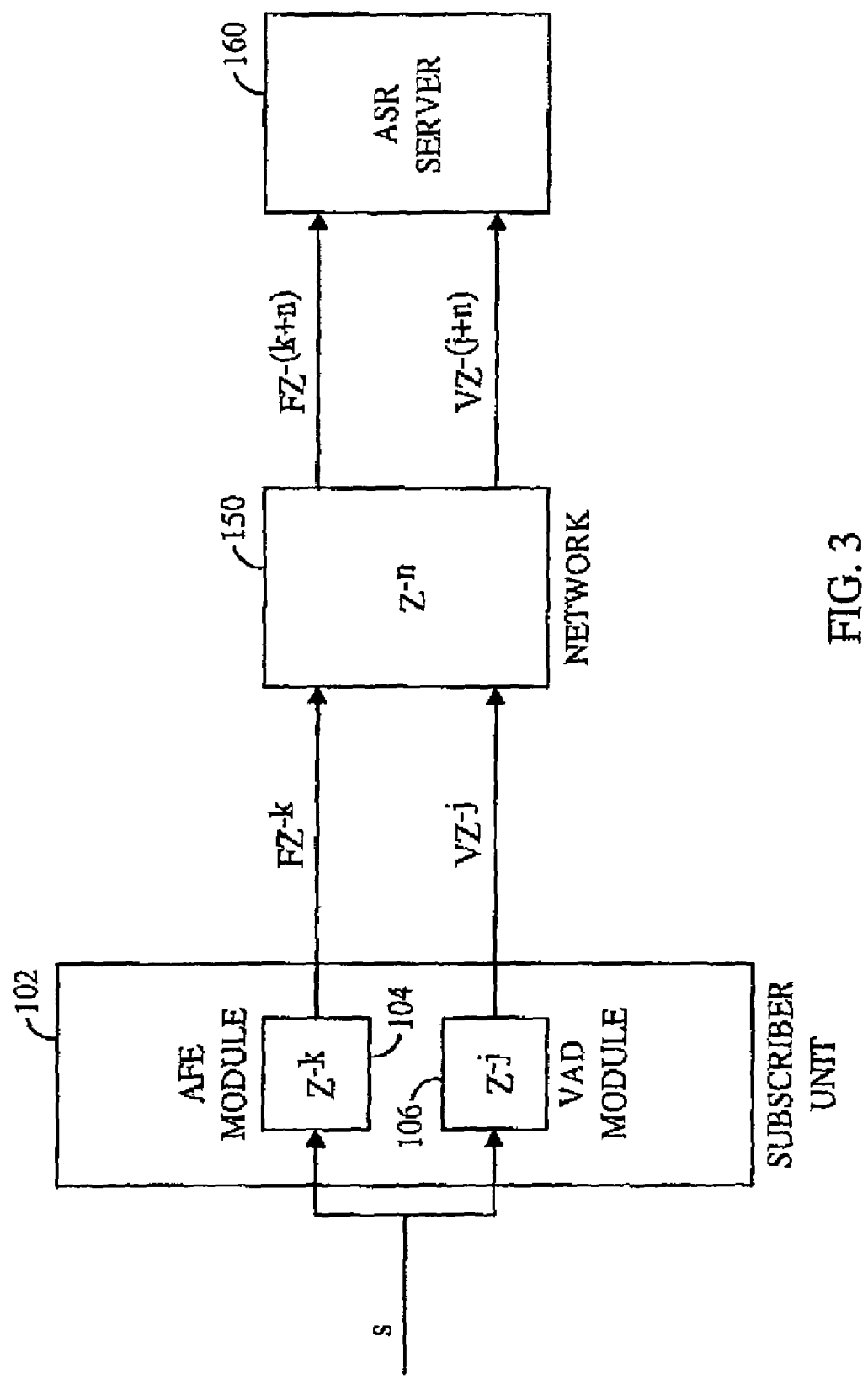
FIG. 3 illustrates delays in an exemplary aspect of a distributed voice recognition system.

FIG. 3 illustrates delays in an exemplary aspect of a distributed voice recognition system 100. The DVR system 100 comprises a subscriber unit 102, a network 150, and a speech recognition (SR) server 160. The subscriber unit 102 is coupled to the network 150 and the network 150 is coupled to the SR server 160. The front-end of the DVR system 100 is the subscriber unit 102, which comprises a feature extraction (FE) module 104, or Advanced Feature Extraction module (AFE) and a voice activity detection (VAD) module 106. The FE 104 performs feature extraction from a speech signal and compression of resulting features. In one aspect, the VAD module 106 determines which frames will be transmitted from a subscriber unit to an SR server. The VAD module 106 divides the input speech into segments comprising frames where speech is detected and the adjacent frames before and after the frame with detected speech. In one aspect, an end of each segment (EOS) is marked in a payload by sending a null frame.

One example of a DVR system having a Voice Activity Detection module is described in Provisional Application No. 60/292,043, filed May 17, 2001, entitled "Method for Reducing Response Time in Distributed Voice Recognition Systems," and Provisional Application No. 60/298,502, filed Jun. 14, 2001, entitled "Method and Apparatus for Transmitting Speech Activity in Distributed Voice Recognition Systems," as well as the U.S. patent application being concurrently filed herewith and related thereto, entitled "System and Method for Transmitting Speech Activity in a Distributed Voice Recognition System," all currently assigned to the assignee of the present invention and incorporated by reference.

Alternately, in Provisional Application 60/292,043, entitled "Method for Reducing Response Time in Distributed Voice Recognition Systems," filed May 17, 2001, which is incorporated by reference herein, the server receives VAD information ahead of front end features. Receipt of VAD information before front end features provides improved recognition accuracy without longer response time because of the longer algorithmic latencies used in the advanced front end (AFE).

The VR front end performs front end processing in order to characterize a speech segment. Vector S is a speech signal and vector F and vector V are FE and VAD vectors, respectively. In one aspect, the VAD vector is one element long and the one element contains a binary value. In another aspect, the VAD vector is a binary value concatenated with additional features. In one aspect, the additional features are band energies enabling server fine end-pointing. End-pointing constitutes demarcation of a speech signal into silence and speech segments. Use of band energies to enable server fine end-pointing allows use of additional computational resources to arrive at a more reliable VAD decision.

Band energies correspond to bark amplitudes. The Bark scale is a warped frequency scale of critical bands corresponding to human perception of hearing. Bark amplitude calculation is known in the art and described in Lawrence Rabiner & Biing-Hwang Juang, Fundamentals of Speech Recognition (1993), which is fully incorporated herein by reference. In one aspect, digitized PCM speech signals are converted to band energies.

FIG. 3 illustrates the delays that may be introduced to a DVR system. S represents the speech signal, while F is an AFE vector and V is a VAD vector. The VAD vector may be a binary value, or alternately a binary value concatenated with additional features. These additional features may include, but are not limited to, band energies to enable fine end-pointing at the server. Delays in computing F and V and transmitting them over the network are illustrated in FIG. 3 in Z notation. The algorithm latency introduced in computing F is k, and k can take various values, including but not limited to the range of 100 to 250 msec. The algorithm latency for computing VAD information is j. j may have various values, including but not limited to 10 to 30 msec. AFE vectors are therefore available with a delay of k and VAD information with a delay of j. Delay introduced in transmitting the information over the network is n, and the network delay is the same for both F and V.

Figure 4:
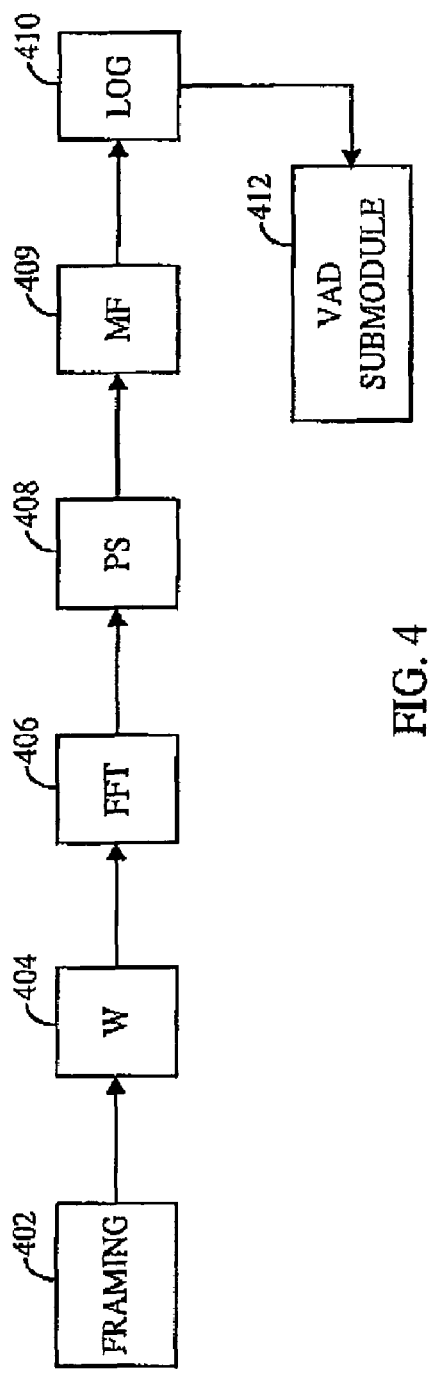
FIG. 4 shows a block diagram of a VAD module in accordance with one aspect of the system.

FIG. 4 illustrates a block diagram of the VAD module 400. The framing module 402 includes an analog-to-digital converter (not shown). In one aspect, the output speech sampling rate of the analog-to-digital converter is 8 kHz. It would be understood by those skilled in the art that other output sampling rates can be used. The speech samples are divided into overlapping frames. In one aspect, the frame length is 25 ms (200 samples) and the frame rate is 10 ms (80 samples).

In one aspect of the current system, each frame is windowed by a windowing module 404 using a Hamming window function.

$$s_w(n) = \left\{0.54 - 0.46 \cdot \cos\left(\frac{2\pi(n-1)}{N-1}\right)\right\} \cdot s(n), 1 \leq n \leq N$$

where N is the frame length and s(n) and $s_w(n)$ are the input and output of the windowing block, respectively.

A fast Fourier transform (FFT) module 406 computes a magnitude spectrum for each windowed frame. In one aspect, the system uses a fast Fourier transform of length 256 to compute the magnitude spectrum for each windowed frame. The first 129 bins from the magnitude spectrum may be retained for further processing. Fast fourier transformation takes place according to the following equation:

$$bin_k = \left|\sum_{n=0}^{FFTL-1} s_w(n) e^{-jnk\frac{2\pi}{FFTL}}\right|, k = 0, \ldots, FFTL-1.$$

where $s_w(n)$ is the input to the FFT module 406, FFTL is the block length (256), and $bin_k$ is the absolute value of the resulting complex vector. The power spectrum (PS) module 408 computes a power spectrum by taking the square of the magnitude spectrum.

In one aspect, a Mel-filtering module (MF) 409 computes a MEL-warped spectrum using a complete frequency range. This band is divided into 23 channels equidistant in MEL frequency scale, providing 23 energy values per frame. In this aspect, Mel-filtering corresponds to the following equations:

$$Mel\{x\} = 2595 * \log_{10}\left(1 + \frac{x}{700}\right),$$

$$f_{c_i} = Mel^{-1}\left[i * Mel\left\{\frac{f_s/2}{23+1}\right\}\right], \quad i = 1, \ldots, 23$$

$$cbin = \text{floor}\left\{\frac{f_{c_i}}{f_s} * FFTL\right\}$$

where floor(.) stands for rounding down to the nearest integer. The output of the MEL filter is the weighted sum of the FFT power spectrum values, bins in each band. Triangular, half overlapped windowing may be employed according to the following equation:

$$fbank_k = \sum_{j=cbin_{k-1}}^{cbin_k} \frac{j - cbin_{k-1}}{cbin_k - cbin_{k-1}} bin_j + \sum_{cbin_i}^{cbin_{i+1}} \frac{cbin_{k+1} - j}{cbin_{k+1} - cbin_k},$$

where $k=1, \ldots, 23$. $cbin_0$ and $cbin_{24}$ denote FFT bin indices corresponding to the starting frequency and half of the sampling frequency, respectively:

$$cbin_0 = 0$$

$$cbin_{24} = \text{floor}\left\{\frac{f_s/2}{f_s} * FFTL\right\} = FFTL/2$$

It would be understood by those skilled in the art that alternate MEL-filtering equations and parameters may be employed depending on the circumstances.

The output of the Mel-filtering module 409 is the weighted sum of FFT power spectrum values in each band. The output of the Mel-filtering module 409 passes through a logarithm module 410 that performs non-linear transformation of the Mel-filtering output. In one aspect, the non-linear transformation is a natural logarithm. It would be understood by those skilled in the art that other non-linear transformations could be used.

A Voice Activity Detector (VAD) sub-module 412 takes as input the transformed output of the logarithm module 409 and discriminates between speech and non-speech frames. As shown in FIG. 4, the transformed output of the logarithm module 410 may be directly transmitted rather than passed to the VAD submodule 412. Bypassing the VAD submodule 412 occurs when Voice Activity Detection is not required, such as when no frames of data are present. The VAD sub-module 412 detects the presence of voice activity within a frame. The VAD sub-module 412 determines whether a frame has voice activity or has no voice activity. In one aspect, the VAD sub-module 412 is a three layer Feed-Forward Neural Net. The Feed-Forward Neural Net may be trained to discriminate between speech and non-speech frames using Backpropagation algorithm. The system performs training offline using noisy databases such as the training part of Aurora2-TIDigits and SpeechDatCar-Italian, artificially corrupted TIMIT and Speech in Noise Environment (SPINE) databases.

Figure 5:
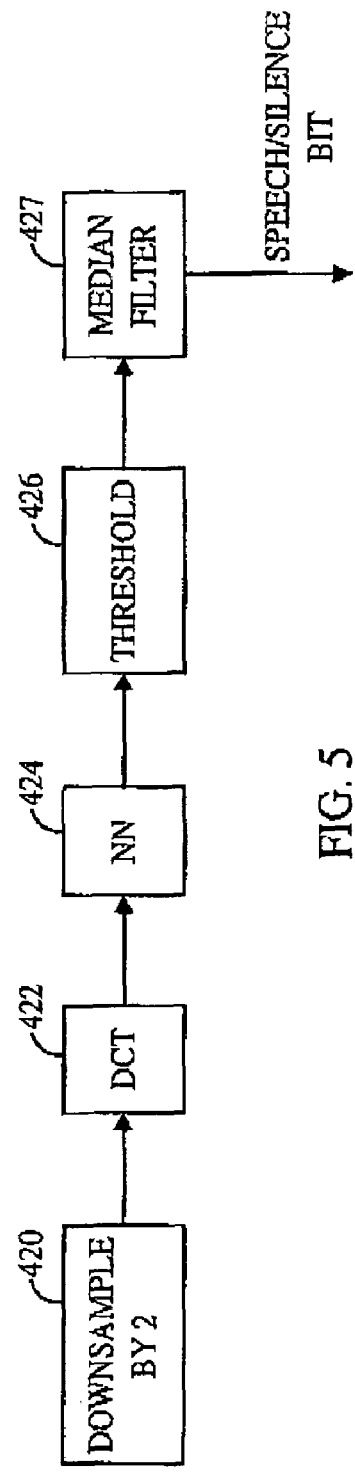
FIG. 5 shows a block diagram of a VAD submodule in accordance with one aspect of the system.

FIG. 5 shows a block diagram of a VAD sub-module 500. In one aspect, a downsample module 420 downsamples the output of the logarithm module by a factor of two.

A Discrete Cosine Transform (DCT) module 422 calculates cepstral coefficients from the downsampled 23 logarithmic energies on the MEL scale. In one aspect, the DCT module 422 calculates 15 cepstral coefficients.

A neural net (NN) module 424 provides an estimate of the posterior probability of the current frame being speech or non-speech. A threshold module 426 applies a threshold to the estimate from the NN module 424 in order to convert the estimate to a binary feature. In one aspect, the system uses a threshold of 0.5.

A Median Filter module 427 smoothes the binary feature. In one aspect, the binary feature is smoothed using an 11-point median filter. In one aspect, the Median Filter module 427 removes any short pauses or short bursts of speech of duration less than 40 ms. In one aspect, the Median Filter module 427 also adds seven frames before and after the transition from silence to speech. In one aspect, the system sets a bit according to whether a frame is determined to be speech activity or silence.

The neural net module 424 and median filter module 427 may operate as follows. The Neural Net module 424 has six input units, fifteen hidden units and one output. Input to the Neural Net module 424 may consist of three frames, current frame and two adjacent frames, of two cepstral coefficients, C0 and C1, derived from the log-Mel-filterbank energies. As the three frames used are after downsampling, they effectively represent five frames of information. During training, neural net module 424 has two outputs, one each for speech and non-speech targets. Output of the trained neural net module 424 may provide an estimate of the posterior probability of the current frame being speech or non-speech. During testing under normal conditions only the output corresponding to the posterior probability of non-speech is used. A threshold of 0.5 may be applied to the output to convert it to a binary feature. The binary feature may be smoothed using an eleven point median filter corresponding to median filter module 427. Any short pauses or short bursts of speech of duration less than approximately 40 ms are removed by this filtering. The filtering also adds seven frames before and after the transition from silence to speech and speech to silence to detected respectively. Although the eleven point median filter, five frames in the past and five frames ahead, causes a delay of ten frames, or about 100 ms. This delay is the result of downsampling and is absorbed into the 200 ms delay caused by the subsequent LDA filtering.

Figure 6:
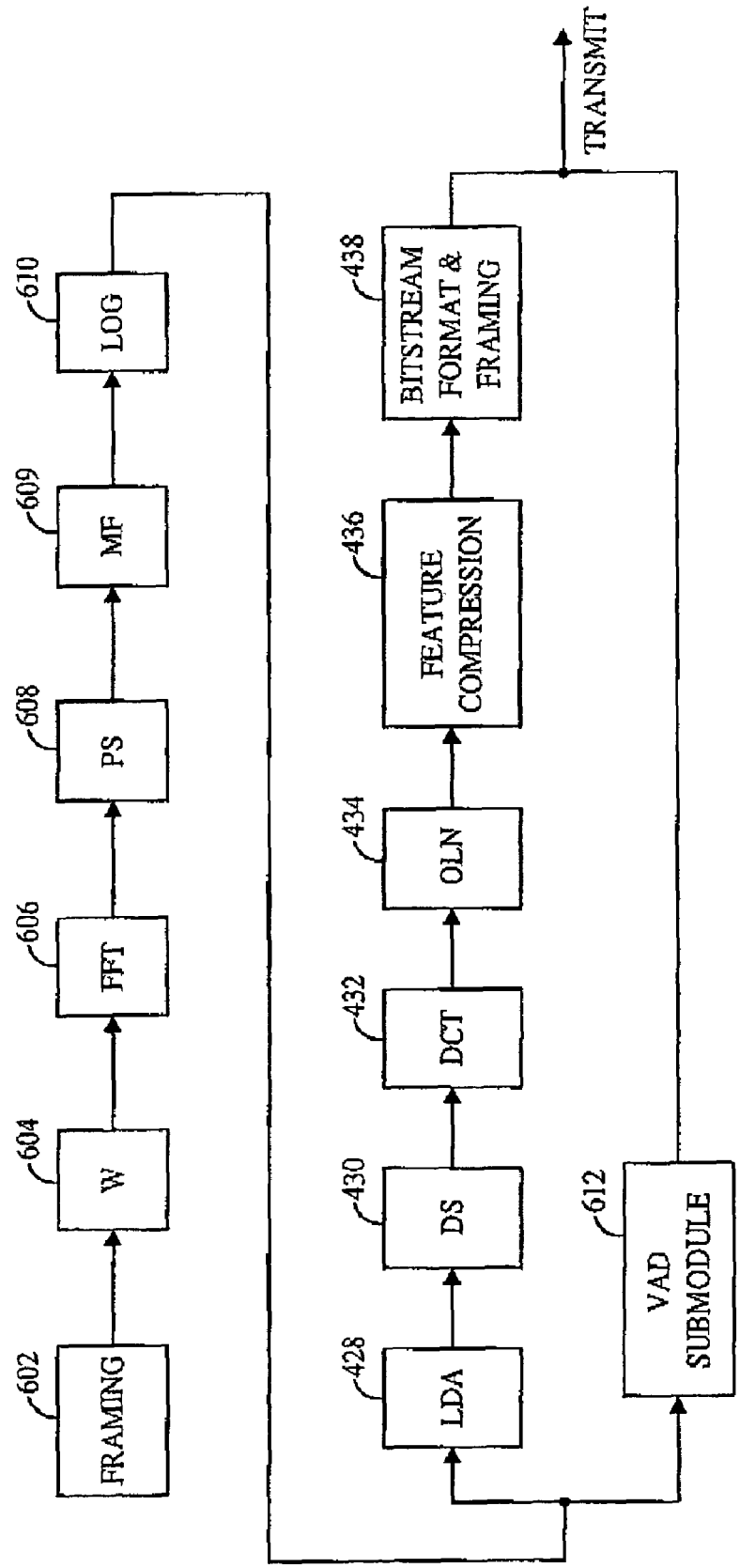
FIG. 6 shows a block diagram of a combined VAD submodule and FE module in accordance with one aspect of the system.

FIG. 6 shows a block diagram of the FE module 600. A framing module 602, windowing module (W) 604, FFT module 606, PS module 608, MF module 609, and a logarithm module 610, are also part of the FE and serve the same functions in the FE module 600 as they do in the VAD module 400. In one aspect, these common modules are shared between the VAD module 400 and the FE module 600.

A VAD sub-module 612 is coupled to the logarithm module 610. A Linear Discriminant Analysis (LDA) module 428 is coupled to the VAD sub-module 612 and applies a bandpass filter to the output of the VAD sub-module 610. In one aspect, the bandpass filter is a RASTA filter. An exemplary bandpass filter that can be used in the VR front end is the RASTA filter described in U.S. Pat. No. 5,450,522 entitled, "Auditory Model for Parametrization of Speech" issued Sep. 12, 1995, which is incorporated by reference herein. As employed herein, the system may filter the time trajectory of log energies for each of the 23 channels using a 41-tap FIR filter. The filter coefficients may be those derived using the linear discriminant analysis (LDA) technique on the phonetically labeled OGI-Stories database known in the art. Two filters may be retained to reduce the memory requirement. These two filters may be further approximated using 41 tap symmetric FIR filters. The filter with 6 Hz cutoff is applied to Mel channels 1 and 2, and the filter with 16 Hz cutoff is applied to channels 3 to 23. The output of the filters is the weighted sum of the time trajectory centered around the current frame, the weighting being given by the filter coefficients. This temporal filtering assumes a look-ahead of approximately 20 frames, or approximately 200 ms. Again, those skilled in the art may use different computations and coefficients depending on circumstances and desired performance.

A downsample module (DS) 430 downsamples the output of the LDA module 428. In one aspect, a downsample module 430 downsamples the output of the LDA module by a factor of two. Time trajectories of the 23 Mel channels may be filtered only every second frame.

A Discrete Cosine Transform (DCT) module 432 calculates cepstral coefficients from the downsampled 23 logarithmic energies on the MEL scale. In one aspect, the DCT module 432 calculates 15 cepstral coefficients according to the following equation:

$$C_i = \frac{\sum_{j=1}^{23} f_i * \cos\left(\frac{\pi \cdot i}{23} \cdot (j - 0.5)\right)}{\sqrt{\sum_{j=1}^{23} \cos\left(\frac{\pi \cdot i}{23} \cdot (j - 0.5)\right) * \cos\left(\frac{\pi \cdot i}{23} \cdot (j - 0.5)\right)}}, 0 \le i \le 14$$

In order to compensate for the noises, an online normalization (OLN) module 434 applies a mean and variance normalization to the cepstral coefficients from the DCT module 432. The estimates of the local mean and variance are updated for each frame. In one aspect, an experimentally determined bias is added to the estimates of the variance before normalizing the features. The bias eliminates the effects of small noisy estimates of the variance in the long silence regions. Dynamic features are derived from the normalized static features. The bias not only saves computation required for normalization but also provides better recognition performance. Normalization may employ the following equations:

$$m_t = m_{t-1} - \alpha(x_t - m_{t-1}).$$
$$\sigma_t^2 = \sigma_{t-1}^2 = \alpha\lfloor(x_t - m_t)^2 - \sigma_{t-1}^2\rfloor$$
$$x_t' = \frac{(x_t - m_t)}{\sigma_t + \theta}$$

where $x_t$ is the cepstral coefficient at time t, $m_t$ and $\sigma_t^2$ are the mean and the variance of the cepstral coefficient estimated at time t, and $x_t'$ is the normalized cepstral coefficient at time t. The value of $\alpha$ may be less than one to provide positive estimate of the variance. The value of $\alpha$ may be 0.1 and the bias, $\theta$ may be fixed at 1.0. The final feature vector may include 15 cepstral coefficients, including C0. These 15 cepstral coefficients constitute the front end output.

A feature compression module 436 compresses the feature vectors. A bit stream formatting and framing module 438 performs bitstream formatting of the compressed feature vectors, thereby preparing them for transmission. In one aspect, the feature compression module 436 performs error protection of the formatted bit stream.

In one aspect of the present invention, the FE or AFE module 600 concatenates vector F $Z^{-k}$ and vector V $Z^{-j}$. According to the depiction in FIG. 3, each FE or AFE feature vector is comprised of a concatenation of vector F $Z^{-k}$ and vector V $Z^{-j}$. In one aspect of the present system, the system transmits VAD output ahead of a payload, which reduces a DVR system's overall latency since the front end processing of the VAD is shorter (j<k) than the AFE front end processing. In one aspect, an application running on the server can determine the end of a user's utterance when vector V indicates silence for more than an $S_{hangover}$ period of time. $S_{hangover}$ is the period of silence following active speech for utterance capture to be complete. $S_{hangover}$ is typically greater than an embedded silence allowed in an utterance. If $S_{hangover}$>k, AFE algorithm latency will not increase the response time. FE features corresponding to time t-k and VAD features corresponding to time t-j may be combined to form extended AFE features. The system transmits VAD output when available and does not depend on the availability of AFE output for transmission. Both the VAD output and the AFE output may be synchronized with the transmission payload. Information corresponding to each segment of speech may be transmitted without frame dropping.

Alternately, according to another aspect of the present invention, channel bandwidth may be reduced during silence periods. Vector F may be quantized with a lower bit rate when vector V indicates silence regions. This lower rate quantizing is similar to variable rate and multi-rate vocoders where a bit rate is changed based on voice activity detection. The system synchronizes both the VAD output and the FE output with the transmission payload. The system then transmits information corresponding to each segment of speech, thereby transmitting VAD output. The bit rate is reduced on frames with silence. Again, information corresponding to each segment of speech may be transmitted on the mobile without frame dropping.

Alternately, only speech frames may be transmitted to the server. Frames with silence are dropped completely. When only speech frames are transmitted to the server, the server may attempt to conclude that the user has finished speaking. This speech completion occurs irrespective of the value of latencies k, j and n. Consider a multi-word like "Portland <PAUSE> Maine" or "617-555-<PAUSE> 1212". The system employs a separate channel to transmit VAD information. AFE features corresponding to the <PAUSE> region are dropped at the subscriber unit. As a result, the server would have no information to deduce that a user has finished speaking without a separate channel. This aspect may employ a separate channel for transmitting VAD information.

Figure 7:
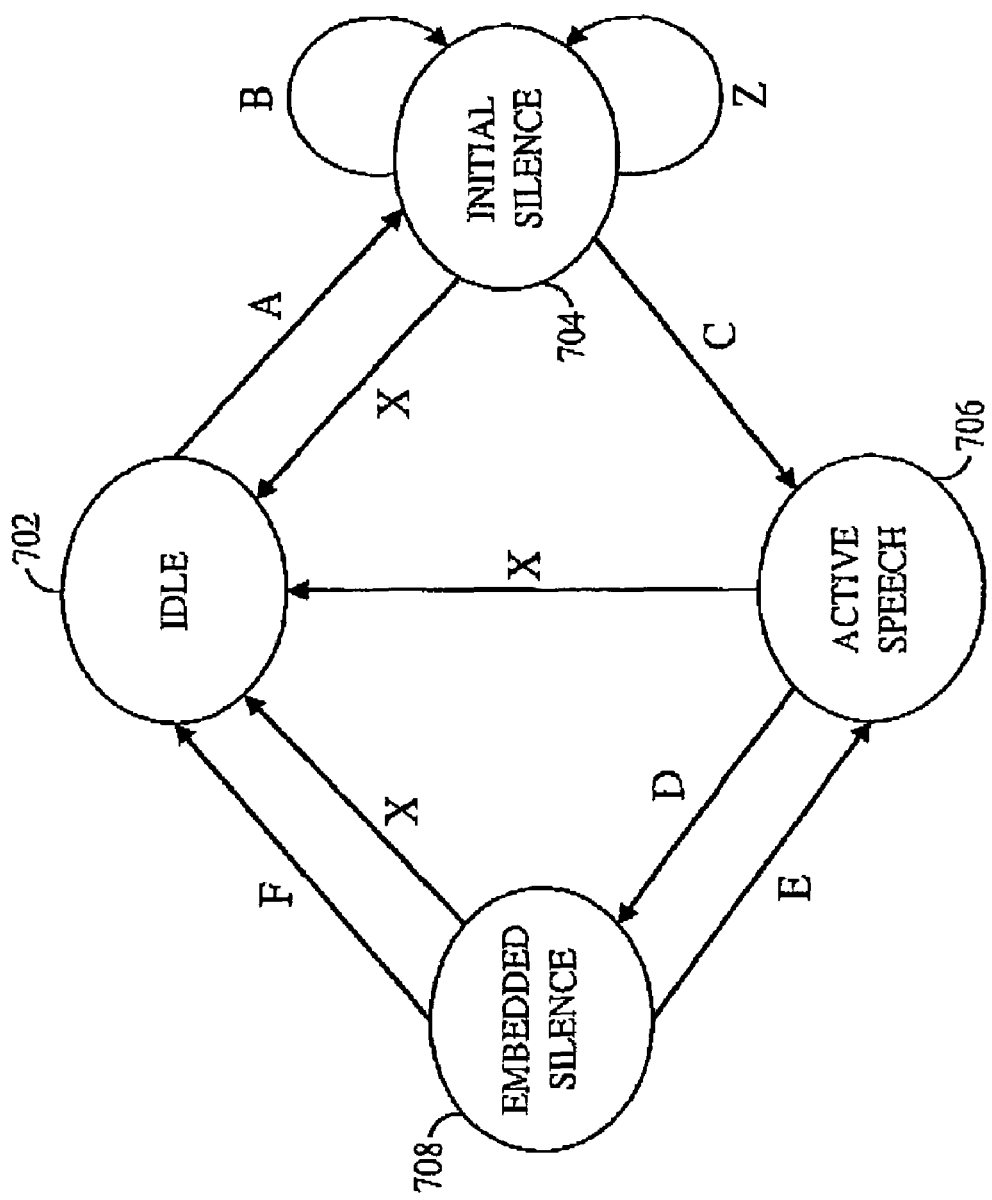
FIG. 7 shows a VAD module state diagram in accordance with one aspect of the system.

In still another aspect of the present invention, the status of a recognizer may be maintained even when there are long pauses in the user's speech as per the state diagram in FIG. 7 and the events and actions in Table 1. When the system detects speech activity, it transmits an average vector of the AFE module 600 corresponding to the frames dropped and the total number of frames dropped prior to transmitting speech frames. In addition, when the terminal or mobile detects that $S_{hangover}$ frames of silence have been observed, this signifies an end of the user's utterance. In one aspect, the speech frames and the total number of frames dropped are transmitted to the server along with the average vector of the AFE module 600 on the same channel. Thus, the payload includes both features and VAD output. In one aspect, the VAD output is sent last in the payload to indicate end of speech.

For a typical utterance, the VAD module 400 will begin in Idle state 702 and transition to Initial Silence state 704 as a result of event A. A few B events may occur, leaving the module in Initial Silence state. When the system detects speech, event C causes a transition to Active Speech state 706. The module then toggles between Active Speech 706 and Embedded Silence states 708 with events D and E. When the embedded silence $S_{sil}$ is longer than $S_{hangover}$, this constitutes an end of utterance and event F causes a transition to Idle state 702. Event Z represents a long initial silence in an utterance. This long initial silence facilitates a TIME OUT error condition when a user's speech is not detected. Event X aborts a given state and returns the module to the Idle state 702. This can be a user or a system initiated event.

Figure 8:
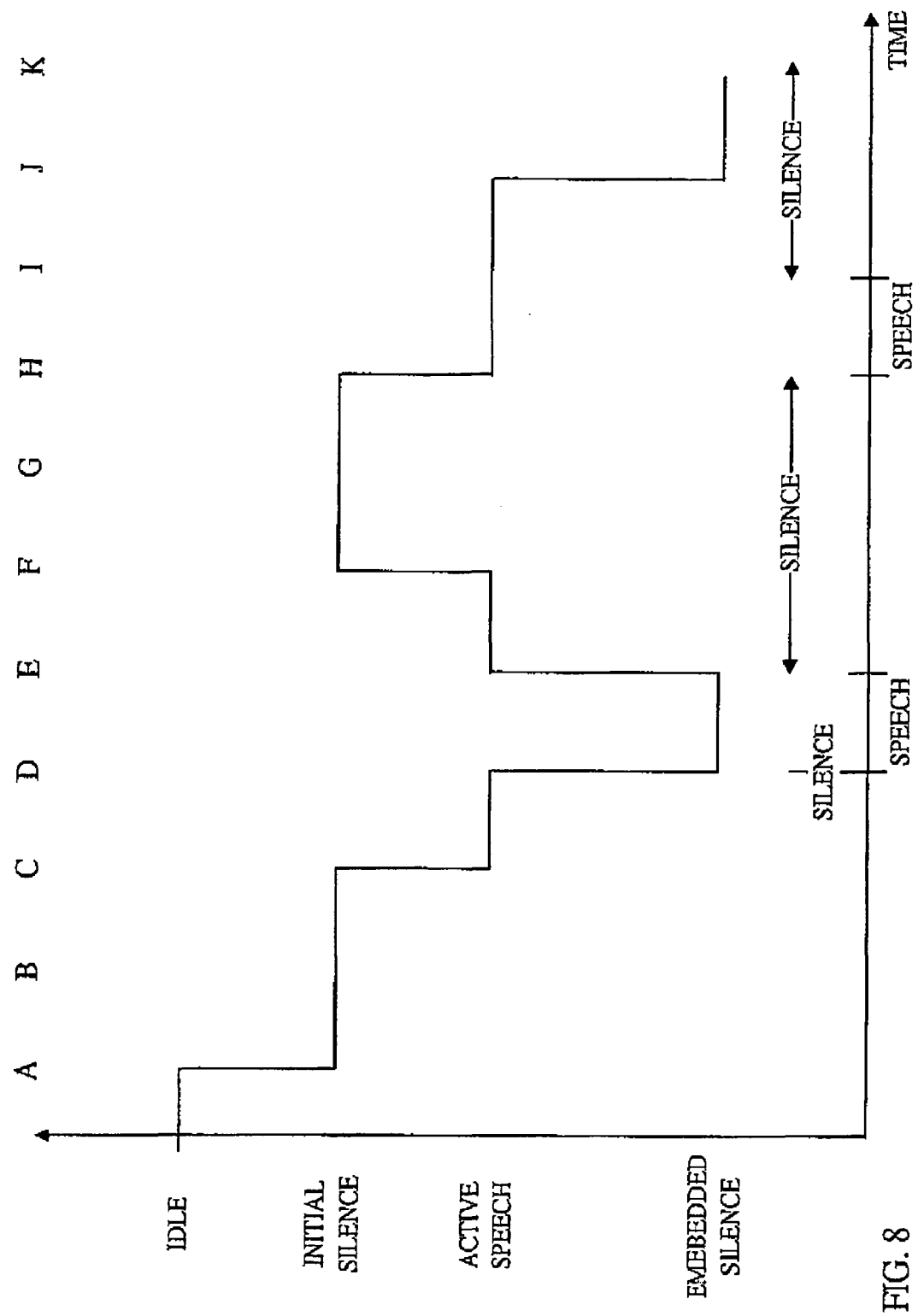
FIG. 8 shows parts of speech and VAD events on a timeline in accordance with one aspect of the system.

FIG. 8 shows parts of speech and VAD events on a timeline. Referring to FIG. 8 and Table 2, the events causing state transitions are shown with respect to the VAD module 400.

TABLE 1

Event Action

A  User initiated utterance capture.
B  $S_{active} < S_{min}$. Active Speech duration is less than minimum utterance duration. Prevent false detection due to clicks and other extraneous noises.
C  $S_{active} > S_{min}$. Initial speech found. Send average FE feature vector, FDcount, $S_{before}$ frames. Start sending FE feature vectors.
D  $S_{sil} > S_{after}$. Send $S_{after}$ frames. Reset FDcount to zero.
E  $S_{active} > S_{min}$. Active speech found after an embedded silence. Send average FE feature vector, FDcount, $S_{before}$ frames. Start sending FE feature vectors.
F  $S_{sil} > S_{hangover}$. End of user's speech is detected. Send average FE feature vector and FDcount.
X  User initiated abort. Can be user initiated from the keypad, server initiated when recognition is complete or a higher priority interrupt in the device.
Z  $S_{sil} >$ MAXSILDURATION. MAXSILDURATION may be < approximately 2.5 seconds for 8 bit FDCounter. Send average FE feature vector and FDcount. Reset FDcount to zero.

In Table 1, $S_{before}$ and $S_{after}$ are the number of silence frames transmitted to the server before and after active speech.

From the state diagram (FIG. 7) and Table 1 events showing the corresponding actions on the mobile, certain thresholds are used in initiating state transitions. It is possible to use certain default values for these thresholds. However, it would be understood by those skilled in the art that other values for the thresholds shown in Table 1 may be used. For example, but not by way of limitation, the server can modify these default values depending on the application. The default values are programmable as identified in Table 2.

TABLE 2

| Segment Name | Coordinates in FIG. 8 | Description |
|---|---|---|
| $S_{min}$ | >(b-a) | Minimum Utterance Duration in frames. Used to prevent false detection of clicks and noises as active speech. |

TABLE 2-continued

| Segment Name | Coordinates in FIG. 8 | Description |
|---|---|---|
| $S_{active}$ | (e-d) and (i-h) | Duration of an active speech segment in frames, as detected by the VAD module. |
| $S_{before}$ | (d-c) and (h-g) | Number of frames to be transmitted before active speech, as detected by the VAD. Amount of silence region to be transmitted preceding active speech. |
| $S_{after}$ | (f-e) and j-i) | Number of frames to be transmitted after active speech, as detected by the VAD. Amount of silence region to be transmitted following active speech. |
| $S_{sil}$ | (d-0), (h-e), (k-i) | Duration of current silence segment in frames, as detected by VAD. |
| $S_{embedded}$ | >(h-e) | Duration of silence in frames ($S_{sil}$) between two active speech segments. |
| FDcount | — | Number of silence frames dropped prior to the current active speech segment. |
| $S_{hangover}$ | <(k-i) >(h-e) | Duration of silence in frames ($S_{sil}$) after the last active speech segments for utterance capture to be complete. $S_{hangover} >= S_{embedded}$ |
| $S_{maxsil}$ | | Maximum silence duration in which the mobile drops frames. If the maximum silence duration is exceeded, then the mobile sends an average FE feature vector and resets the counter to zero. This is useful for keeping the recognition state on the server active. |
| $S_{minsil}$ | | Minimum silence duration expected before and after active speech. If less than Sminsil is observed prior to active speech, the server may decide not to perform certain adaptation tasks using the data. This is sometimes termed Spoke_Too_Soon error. The server can deduce this condition from the Fdcount value and a separate variable may not be needed. |

In one aspect, the minimum utterance duration 5 min is around 100 msec. In another aspect, the amount of silence region to be transmitted preceding active speech $S_{before}$ is around 200 msec. In another aspect, $S_{after}$, the amount of silence to be transmitted following active speech is around 200 msec. In another aspect, the amount of silence duration following active speech for utterance capture to be complete, $S_{hangover}$, is between 500 msec to 1500 msec., depending on the VR application. In still another aspect, an eight bit counter enables 2.5 seconds of $S_{maxsil}$ at 100 frames per second. In yet another aspect, minimum silence duration expected before and after active speech $S_{minsil}$ is around 200 msec.

Figure 9:
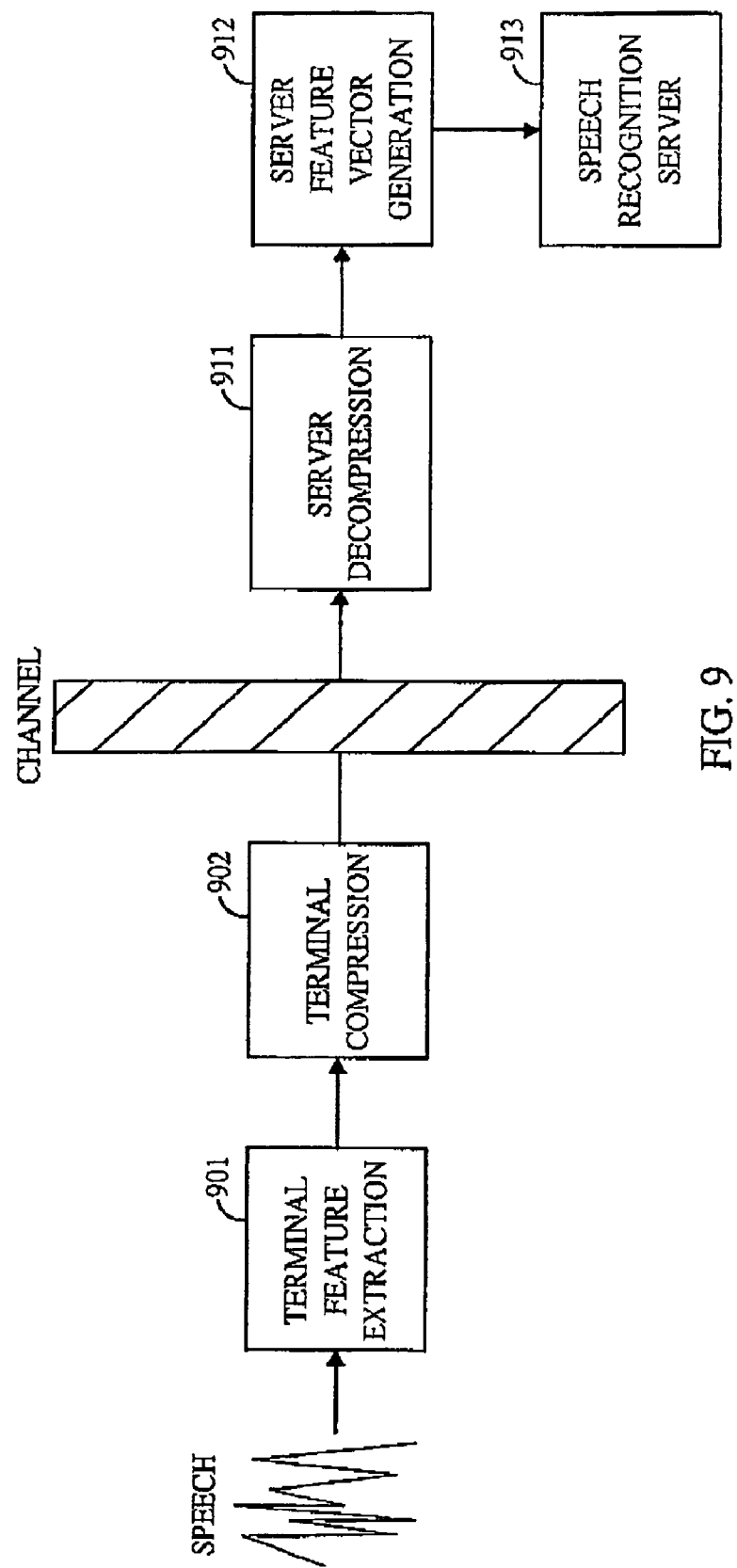
FIG. 9 an overall system block diagram including terminal and server components.

FIG. 9 shows the overall system design. Speech passes through the terminal feature extraction module 901, which operates as illustrated in FIGS. 4, 5, and 6. Terminal compression module 902 is employed to compress the features extracted, and output from the terminal compression module 902 passes over the channel to the server. Server decompression module 911 decompresses the data and passes it to server feature vector generation module 912, which passes data to Speech Recognition Server module 913.

Terminal compression module 902 employs vector quantization to quantize the features. The feature vector received from the front end is quantized at the terminal compression module 902 with a split vector quantizer. Received cepstral coefficients are grouped into pairs, except C0, and each pair is quantized using its own vector quantization codebook. The resulting set of index values is used to represent the speech frame. One aspect of coefficient pairings with corresponding codebook sizes are shown in Table 3. Those of skill in the art will appreciate that other pairings and codebook sizes may be employed while still within the scope of the present system.

TABLE 3

| Codebook | Size | Weight Matrix | Elements | Bits |
|---|---|---|---|---|
| Q0–1 | 32 | I | C13–14 | 5 |
| Q2–3 | 32 | I | C11, C12 | 5 |
| Q4–5 | 32 | I | C9, C10 | 5 |
| Q6–7 | 32 | I | C7, C8 | 5 |
| Q8–9 | 32 | I | C5, C6 | 5 |
| Q10–11 | 64 | I | C3, C4 | 6 |
| Q12–13 | 128 | I | C1, C2 | 7 |
| Q14 | 64 | I | C0 | 6 |

To determine the index, the system may find the closest vector quantized (VQ) centroid using a Euclidean distance, with the weight matrix set to the identity matrix. The number of bits required for description of one frame after packing indices to the bit stream may be approximately 44. The LBG algorithm, known in the art, is used for training of the codebook. The system initializes the codebook with the mean value of all training data. In every step, the system splits each centroid into two and the two values are re-estimated. Splitting is performed in the positive and negative direction of standard deviation vector multiplied by 0.2 according to the following equations:

$$\mu_i^- = \mu_i - 0.2 \cdot \sigma_i$$
$$\mu_i^+ = \mu_i + 0.2 \cdot \sigma_i$$

where $\mu_i$ and $\sigma_i$ are the mean and standard deviation of the ith cluster respectively.

Figures 10, 11:
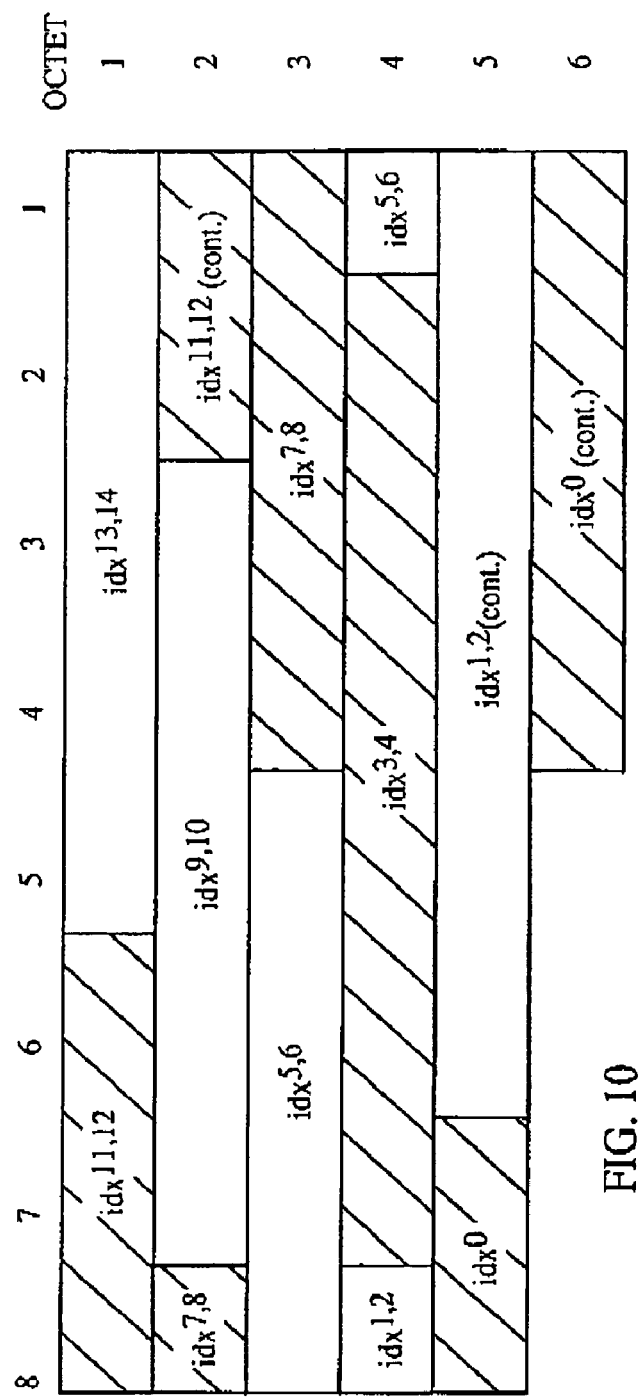
FIG. 10 shows frame information for the mth frame.
FIG. 11 is the CRC protected packet stream.

The bitstream employed to transmit the compressed feature vectors is as shown in FIG. 10. The frame structure is well known in the art and the frame with a modified frame packet stream definition. One common example of frame structure is defined in ETSI ES 201 108 v1.1.2, "Distributed Speech Recognition; Front-end Feature Extraction Algorithm; Compression Algorithm", Apr. 2000 ("the ETSI document"), the entirety of which is incorporated herein by reference. The ETSI document discusses the multiframe format, the synchronization sequence, and the header field. Indices for a single frame are formatted as shown in FIG. 10. Precise alignment with octet boundaries can vary from frame to frame. From FIG. 10, two frames of indices or 88 bits are grouped together as pair. The features may be downsampled, and thus the same frame is repeated as shown in FIG. 11. This frame repetition avoids delays in feature transmission. The system employs a four bit cyclic redundancy check (CRC) and combines the frame pair packets to fill the 138 octet feature stream commonly employed, such as in the ETSI document. The resulting format requires a data rate of 4800 bits/s.

On the server side, the server performs bitstream decoding and error mitigation as follows. An example of bitstream decoding, synchronization sequence detection, header decoding, and feature decompression may be found in the ETSI document. Error mitigation occurs in the present system by first detecting frames received with errors and subsequently substituting parameter values for frames received with errors. The system may use two methods to determine if a frame pair packet has been received with errors, CRC and Data Consistency. For the CRC method, an error exists when the CRC recomputed from the indices of the received frame pair packet data does not match the received CRC for the frame pair. For the Data Consistency method, the server compares parameters corresponding to each index, $\text{idx}^{i, i+1}$ of the two frames within a frame packet pair to determine if either of the indices are received with errors according to the following equation:

$$badindexflag_i =$$
$$\begin{cases} 1 & \text{if}(y_i(m+1) - y_i(m) > 0) \text{ OR}(y_{i+1}(m+1) - y_{i+1}(m) > 0) \\ 0 & \text{otherwise} \end{cases}$$
$$i = 0, 2, \ldots, 13$$

The frame pair packet is classified as received with error if:

$$\sum_{i=0,2,\ldots,13} badindexflag_i \geq 2$$

The system may apply the Data Consistency check for errored data when the server detects frame pair packets failing the CRC test. The server may apply the Data Consistency check to the frame pair packet received before the one failing the CRC test and subsequently to frames after one failing the CRC test until one is found that passes the Data Consistency test.

After the server has determined frames with errors, it substitutes parameter values for frames received with errors, such as in the manner presented in the ETSI document.

Figure 12:
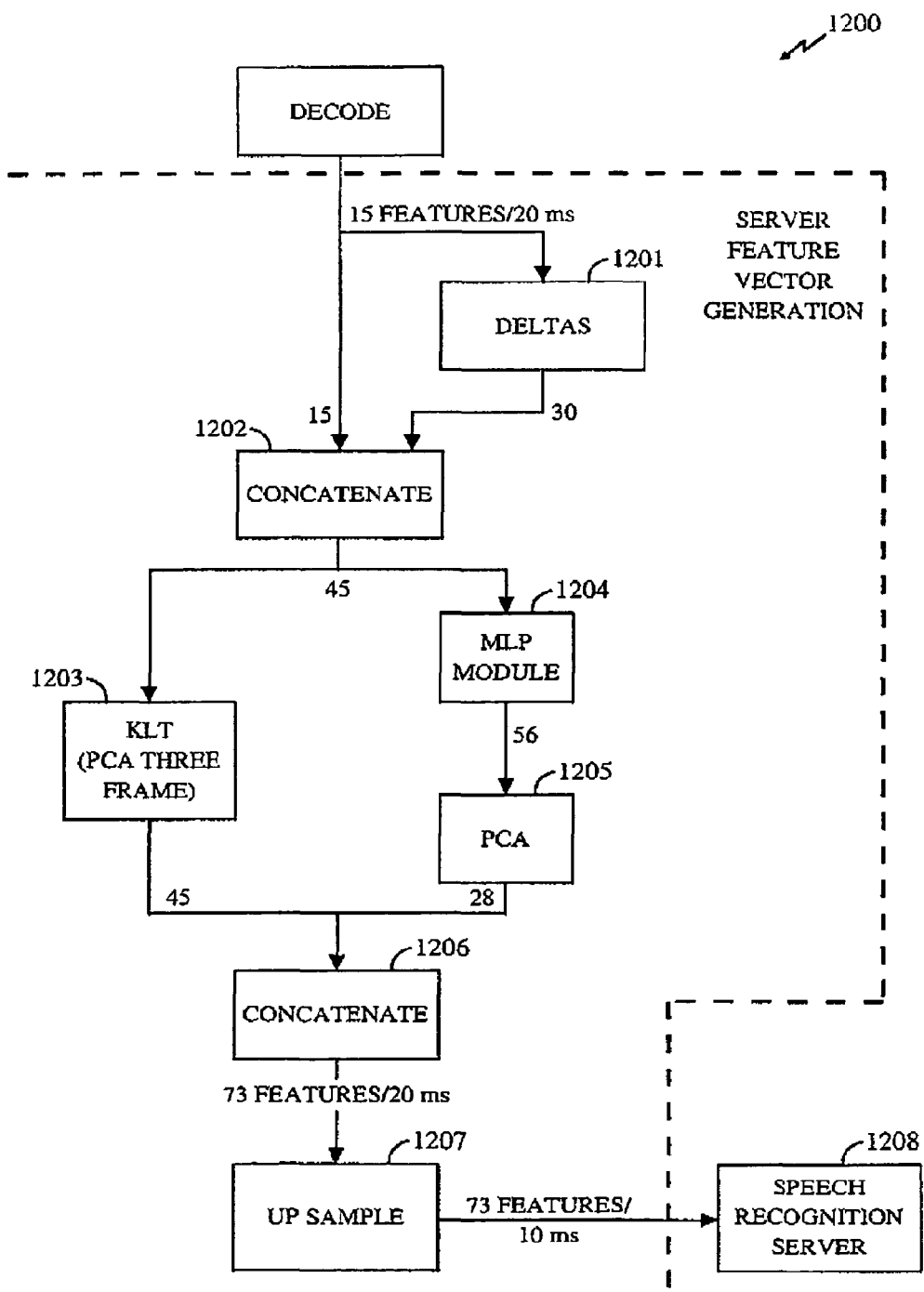
FIG. 12 shows server feature vector generation.

Server feature vector generation occurs according to FIG. 12. From FIG. 12, server decompression transmits 15 features in 20 milliseconds. Delta computation module 1201 computes time derivatives, or deltas. The system computes derivatives according to the following regression equation:

$$delta_i = \frac{\sum_{l=1}^{L} l * (x_{i+1} - x_{i-1})}{2\sum_{l=1}^{L} l^2}$$

where $x_i$ is the $t_{th}$ frame of the feature vector

The system computes second order derivatives by applying this equation to already calculated deltas. The system then concatenates the original 15-dimensional features by the derivative and double derivative at concatenation block 1202, yielding an augmented 45-dimensional feature vector. When calculating the first derivatives, the system may use an L of size 2, but may use an L of size 1 when calculating the double derivatives. Those of skill in the art will recognize that other parameters may be used while still within the scope of the present system, and other calculations may be employed to compute the delta and derivatives. Use of low L sizes keeps latency relatively low, such as on the order of 40 ms, corresponding to two frames of future input.

KLT Block 1203 represents a Contextual Karhunen-Loeve Transformation (Principal Component Analysis), whereby three consecutive frames (one frame in the past plus current frame plus one frame in the future) of the 45-dimensional vector are stacked together to form a 1 by 135 vector. Prior to mean normalization, the server projects this vector using basis functions obtained through principal component analysis (PCA) on noisy training data. One example of PCA that may be employed uses a portion of the TIMIT database downsampled to 8 Khz and artificially corrupted by various types of noises at different signal to noise ratios. More precisely, the PCA takes 5040 utterances from the core training set of TIMIT and equally divides this set into 20 equal sized sets. The PCA may then add the four noises found in the Test A set of Aurora2's English digits, i.e., subway, babble, car, and exhibition, at signal to noise ratios of clean, 20, 15, 10, and 5 dB. The PCA keeps only the first 45 elements corresponding to the largest eigenvalues and employs a vector-matrix multiplication.

The server may apply a non-linear transformation to the augmented 45-dimensional feature vector, such as one using a feed-forward multilayer perceptron (MLP) in MLP module 1204. One example of an MLP is that shown in Bourlard and Morgan, "Connectionist Speech Recognition a Hybrid Approach," Kluwer Academic Publishers, 1994, the entirety of which is incorporated herein by reference. The server stacks five consecutive feature frames together to yield a 225 dimensional input vector to the MLP. This stacking can create a delay of two frames (40 ms). The server then normalizes this 225 dimensional input vector by subtracting and dividing the global mean and the standard deviation calculated on features from a training corpus respectively. The MLP has two layers excluding the input layer; the hidden layer consists of 500 units equipped with sigmoid activation function, while the output layer consists of 56 output units equipped with softmax activation function. The MLP is trained on phonetic targets (56 monophones of English typically used at ICSI) from a labeled database with added noise such as that outlined above with respect to the PCA transformation. During recognition, the server may not use the softmax function in the output units, so the output of this block corresponds to "linear outputs" of the MLP's hidden layer. The server also subtracts the average of the 56 "linear outputs" from each of the "linear outputs" according to the following equation:

$$LinOut_i^* = LinOut_i - \frac{\sum_{i=1}^{56} LinOut_i}{56}$$

where $LinOut_i$ is the linear output of the ith output unit and $LinOut_i^*$ is the mean subtracted linear output The server can store each weight of the MLP in two byte words. One example of an MLP module 1204 has 225*500=112500 input to hidden weights, 500*56=28000 hidden to output weights, and 500+56=556 bias weights. The total amount of memory for this configuration required to store the weights is 141056 words. For each frame of output from the MLP module 1204, the server may have each unit in the MLP perform a multiplication of its input by its weights, an accumulation, and for the hidden layers a look-up in the table for the sigmoid function evaluation. The look-up table may have a size of 4000 two byte words. Other MLP module configurations may be employed while still within the scope of the present system.

The server performs Dimensionality Reduction and Decorrelation using PCA in PCA block 1205. The server applies PCA to the 56-dimensional "linear output" of the MLP module 1204. This PCA application projects the features onto a space with orthogonal bases. These bases are precomputed using PCA on the same data that is used for training the MLP as discussed above. Of the 56 features, the server may select the 28 features corresponding to the largest eigenvalues. This computation involves multiplying a 1 by 56 vector with a 56 by 28 matrix.

Second concatenation block 1206 concatenates the vectors coming from the two paths for each frame to yield to a 73-dimensional feature vector. Up sample module 1207 up samples the feature stream by two. The server uses linear interpolation between successive frames to obtain the up sampled frames. 73 features are thereby transmitted to the Speech Recognition Server algorithm.

Thus, a novel and improved method and apparatus for voice recognition has been described. Those of skill in the art will understand that the various illustrative logical blocks, modules, and mapping described in connection with the aspects disclosed herein may be implemented as electronic hardware, computer software, or combinations of both. The various illustrative components, blocks, modules, circuits, and steps have been described generally in terms of their functionality. Whether the functionality is implemented as hardware or software depends upon the particular application and design constraints imposed on the overall system. Skilled artisans recognize the interchangeability of hardware and software under these circumstances, and how best to implement the described functionality for each particular application.

As examples, the various illustrative logical blocks, modules, and mapping described in connection with the aspects disclosed herein may be implemented or performed with a processor executing a set of firmware instructions, an application specific integrated circuit (ASIC), a field programmable gate array (FPGA) or other programmable logic device, discrete gate or transistor logic, discrete hardware components such as, e.g., registers, any conventional programmable software module and a processor, or any combination thereof designed to perform the functions described herein. The VAD module 400 and the FE module 600 may advantageously be executed in a microprocessor, but in the alternative, the VAD module 400 and the FE module 600 may be executed in any conventional processor, controller, microcontroller, or state machine. The templates could reside in RAM memory, flash memory, ROM memory, EPROM memory, EEPROM memory, registers, hard disk, a removable disk, a CD-ROM, or any other form of storage medium known in the art. The memory (not shown) may be integral to any aforementioned processor (not shown). A processor (not shown) and memory (not shown) may reside in an ASIC (not shown). The ASIC may reside in a telephone.

The previous description of the embodiments of the invention is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

What is claimed is:

1. A method of operating a speech recognition system employed by a wireless subscriber station, comprising:

receiving an acoustic speech signal, including periods of speech and non-speech, from a user of the wireless subscriber station;

converting the acoustic speech signal to an electrical speech signal;
assembling detected voice activity information related to the electrical speech signal;
identifying feature extraction information related to the electrical speech signal;
selectively utilizing said detected voice activity information and said feature extraction information to form advanced front end data;
transmitting the detected voice activity information over a first wireless communication channel to a wireless base station, and
transmitting the feature extraction information over a second wireless communication channel, separate from the first wireless communication channel, to the wireless base station.

2. The method of claim 1, wherein the identification of feature extraction information comprises extracting a set of features corresponding to segments of the electrical speech signal.

3. The method of claim 2, wherein the transmitting the feature extraction information further comprises:
removing segments of silence from the electrical speech signal, and
transmitting silence-free speech segments of the electrical speech signal over the second wireless communication channel to the wireless base station.

4. The method of claim 3, wherein the transmitting the detected voice activity information further comprises:
transmitting over the first communication channel at least one indication where the segments of silence exist in the electrical speech signal to permit the silence-free speech segments transmitted over second wireless communication channel to be separated responsive to the at least one indication for use of the silence-free speech segments.

5. The method of claim 1, wherein the wireless subscriber station further comprises a cellular radiotelephone.

6. The method of claim 1,
wherein the transmitting the feature extraction information further comprises:
transmitting a representation of the electrical speech signal, including silence, over the second wireless communication channel to the wireless base station; and
wherein the transmitting the detected voice activity information further comprises:
transmitting at least one indication where silence regions exist over the first communication channel to permit periods of speech to be separated from silence regions for use of the periods of speech.

7. The method of claim 1, further comprising assembling detected voice activity information substantially in parallel to identifying the feature extraction information.

8. The method of claim 7, wherein voice detection activity is quantized at a lower rate when identification of the feature extraction information indicates silence regions.

9. The method of claim 7, wherein assembling the detected voice activity information comprises determining a voice activity vector, and identifying the feature extraction information comprises determining a feature extraction vector, and the method further comprises concatenating the voice activity vector and the feature extraction vector to process and determine the advanced front end data.

10. The method of claim 1, wherein identification of feature extraction information comprises determining a feature extraction vector.

11. The method of claim 10, wherein the determining comprises:
detecting speech activity and upon detecting speech activity, computing an average feature extraction vector corresponding to frames dropped; and
transmitting a total number of frames dropped over one of the first and second wireless communication channel to the wireless base station prior to transmitting speech frames over the second wireless communication channel to the wireless base station.

12. A wireless subscriber station, comprising:
a microphone for receiving an acoustic speech signal, including periods of speech and non-speech, from a user of the wireless subscriber station, and for converting the acoustic speech signal to an electrical speech signal;
a voice activity detector for detecting voice activity information related to the electrical speech signal;
a feature extractor, operating substantially in parallel to the voice activity detector, for identifying feature extraction information related to the electrical speech signal;
a processor for selectively utilizing the detected voice activity information and the feature extraction information to form advanced front end data; and
a transmitter for transmitting the detected voice activity information over a first wireless communication channel to a wireless base station, and transmitting the feature extraction information over a second wireless communication channel, separate from the first wireless communication channel, to the wireless base station.

13. The wireless subscriber station of claim 12, wherein the wireless subscriber station is a cellular radiotelephone.

14. The wireless subscriber station of claim 12, wherein the transmitter transmitting the feature extraction information further comprises:
removing segments of silence from the electrical speech signal, and
transmitting silence-free speech segments of the electrical speech signal over the second wireless communication channel to the wireless base station.

15. The wireless subscriber station of claim 14, wherein the transmitter transmitting the detected voice activity information further comprises:
transmitting over the first communication channel at least one indication where the segments of silence exist in the electrical speech signal to permit the silence-free speech segments transmitted over second wireless communication channel to be separated responsive to the at least one indication for use of the silence-free speech segments.

16. The wireless subscriber station of claim 12, wherein:
the transmitter transmitting the feature extraction information further comprises:
transmitting a representation of the electrical speech signal, including silence, over the second wireless communication channel to the wireless base station;
the transmitter transmitting the detected voice activity information further comprises:
transmitting at least one indication of where silence regions exist over the first communication channel to permit periods of speech to be separated from silence regions for use of the periods of speech.

17. The wireless subscriber station of claim 12, wherein the wireless subscriber station quantizes voice detection activity from the voice activity detector at a lower rate in circumstances where identification of feature extraction information indicates silence regions.

18. The wireless subscriber station of claim 12, wherein the voice activity detector determines a voice activity vector, and the feature extractor determines a feature extraction vector.

19. The wireless subscriber station of claim 18, wherein the wireless subscriber station concatenates the voice activity vector and the feature extraction vector to process and determine the advanced front end data.

20. The wireless subscriber station of claim 12, wherein the feature extractor determines a feature extraction vector.

21. The wireless subscriber station of claim 20, wherein the wireless subscriber station computes an average feature extraction vector corresponding to frames dropped upon detecting speech activity and transmits a total number of frames dropped over one of the first and second wireless communication channel to the wireless base station prior to transmitting speech frames over the second wireless communication channel to the wireless base station.

22. A method of operating a distributed speech recognition system employed by a wireless subscriber station, comprising:
  receiving an acoustic speech signal, including periods of speech and non-speech, from a user of the wireless subscriber station;
  converting the acoustic speech signal to electrical speech data;
  extracting voice activity data from the electrical speech data;
  identifying feature extraction data from the electrical speech data; and
  transmitting the detected voice activity information over a first wireless communication channel to a wireless base station, and
  transmitting the feature extraction information over a second wireless communication channel, separate from the first wireless communication channel, to the wireless base station.

23. The method of claim 22, wherein identifying the feature extraction data comprises extracting a set of features corresponding to segments of the electrical speech data.

24. The method of claim 23, wherein transmitting the feature extraction information further comprises:
  removing segments of silence from the electrical speech signal, and
  transmitting silence-free speech segments of the electrical speech signal over the second wireless communication channel to the wireless base station.

25. The method of claim 24, wherein the transmitting the detected voice activity information further comprises:
  transmitting over the first communication channel at least one indication where the segments of silence exist in the electrical speech signal to permit the silence-free speech segments transmitted over second wireless communication channel to be separated responsive to the at least one indication for use of the silence-free speech segments.

26. The method of claim 22, wherein the wireless subscriber station further comprises a cellular radiotelephone.

27. The method of claim 22,
  wherein the transmitting the feature extraction information further comprises:
    transmitting a representation of the electrical speech data, including silence, over the second wireless communication channel to the wireless base station; and
  wherein the transmitting the detected voice activity information further comprises:
    transmitting at least one indication where at least one silence region exists over the first communication channel to permit periods of speech to be separated from silence regions for use of the periods of speech.

28. The method of claim 22, further comprising extracting voice activity data substantially in parallel to identifying the feature extraction data.

29. The method of claim 28, wherein voice activity data is quantized to advanced front end data at a lower rate when identification of feature extraction data indicates silence regions.

30. The method of claim 28, wherein voice activity detection comprises determining a voice activity vector, and identification the feature extraction data comprises determining a feature extraction vector, and the method further comprises concatenating the voice activity vector and the feature extraction vector to process and determine extended data.

31. The method of claim 22, wherein identification of feature extraction data comprises determining a feature extraction vector.

32. The method of claim 31, wherein the determining comprises:
  detecting speech activity and upon detecting speech activity, computing an average feature extraction vector corresponding to frames dropped; and
  transmitting a total number of frames dropped over one of the first and second wireless communication channel to the wireless base station prior to transmitting speech frames over the second wireless communication channel to the wireless base station.

33. A method of operating a distributed speech recognition service, comprising:
  performing, by a wireless subscriber station, a first portion of the distributed speech recognition service, comprising:
    receiving an acoustic speech signal, including periods of speech and non-speech, from a user of the wireless subscriber station;
    converting the acoustic speech signal to an electrical speech signal;
    assembling detected voice activity information related to the electrical speech signal;
    identifying feature extraction information related to the electrical speech signal;
    selectively utilizing the detected voice activity information and the feature extraction information; and
    transmitting the detected voice activity information over a first wireless communication channel to a wireless base station, and
    transmitting the feature extraction information over a second wireless communication channel, separate from the first wireless communication channel, to the wireless base station; and
  performing, by a wireless base station, a second portion of the distributed speech recognition service, comprising:
    receiving the detected voice activity information over the first wireless communication channel and the feature extraction information over the second wireless communication channel;
    determining a linguistic estimate of the electrical speech signal responsive to the detected voice activity information over the first wireless communication channel and the feature extraction information over the second wireless communication channel; and transmitting information over a third wireless communication channel from the wireless base station to the wireless subscriber station responsive to the linguistic estimate of the electrical speech signal for controlling the wireless subscriber station.

34. A method of operating a speech recognition service employed by a wireless based station, comprising:

receiving from a wireless subscriber station advanced front end data, including detected voice activity information sent over a first wireless communication channel and feature extraction information send over a second wireless communication channel, separate from the first wireless communication channel, wherein the wireless subscriber station comprises:

receiving an acoustic speech signal, including periods of speech and non-speech, from a user of the wireless subscriber station;

converting the acoustic speech signal to an electrical speech signal;

assembling the detected voice activity information related to the electrical speech signal;

identifying feature extraction information related to the electrical speech signal;

selectively utilizing the detected voice activity information and the feature extraction information to form the advanced front end data; and determining a linguistic estimate of the electrical speech signal responsive to receiving the advanced front end data; and transmitting information over a third wireless communication channel from the wireless base station to the wireless subscriber station responsive to the linguistic estimate of the electrical speech signal for controlling the wireless subscriber station.

\* \* \* \* \*